US007391762B2

(12) United States Patent
Ko (10) Patent No.: US 7,391,762 B2
(45) Date of Patent: *Jun. 24, 2008

(54) CALL PROCESSING MESSAGE CONVERTER AND MESSAGE CONVERTING METHOD IN INTERNET PROTOCOL TELEPHONY EXCHANGE SYSTEM

(75) Inventor: Chae-Ho Ko, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 857 days.

This patent is subject to a terminal disclaimer.

(21) Appl. No.: 10/267,852

(22) Filed: Oct. 10, 2002

(65) Prior Publication Data

US 2003/0072301 A1 Apr. 17, 2003

(30) Foreign Application Priority Data

Oct. 13, 2001 (KR) .............................. 2001-63241

(51) Int. Cl.
*H04L 12/66* (2006.01)
(52) U.S. Cl. ..................................................... 370/352
(58) Field of Classification Search ................. 370/352, 370/338, 349, 328, 466, 353, 490, 401; 455/433; 379/230
See application file for complete search history.

(56) References Cited

U.S. PATENT DOCUMENTS 6,097,804 A * 8/2000 Gilbert et al. ............... 379/230

(Continued)

FOREIGN PATENT DOCUMENTS

EP 1 113 659 12/2000

(Continued)

OTHER PUBLICATIONS

Fossaceca et al, The PathStar Access Server: Facilitating Carrier-Scale Packet Telephony, Bell Labs Technical Journal, pp. 86-102, 1998.*

(Continued)

*Primary Examiner*—Frank Duong
(74) *Attorney, Agent, or Firm*—Robert E. Bushnell, Esq.

(57) ABSTRACT

The present invention relates to a call processing message converter and message converting method in an IP-PBX system, capable of controlling IP terminals equally to legacy terminals by transceiving user information with IP terminals. The message converter works best especially for the IP-PBX system, wherein the system includes: a hub connected to an Internet protocol (IP) network, having a plurality of LAN communication ports; user information interface connected to the LAN communication port of the hub for generating user information and for outputting the generated user information or for converting received exchange user information to an identifiable state to users; at least one IP terminal for performing VoIP function in conforming to a pre-designated data communication protocol procedure; IP driver connected to the LAN communication port of the hub for controlling Internet protocol endpoints; and IP-PBX, mounted with a database where telephone numbers of a legacy terminal and the plurality of IP terminals and corresponding terminal information, and an exchange interface and a gateway connected to the LAN communication port of the hub, respectively, for conducting call processing services corresponding to user information that is sent to the exchange interface and call connection information that is generated from the legacy terminal. The call processing message converter is built in the IP driver, and the converter analyzes an ARQ (Admission request) message transported from a terminating IP terminal, transports port information and digit information of the IP terminal to a call processing module inside of the IP-PBX, and transports a termination seizure message transported from the call processing module and user control information of a terminating IP terminal to a terminating terminal.

13 Claims, 2 Drawing Sheets

U.S. PATENT DOCUMENTS

| | | | | |
|---|---|---|---|---|
| 6,154,465 | A | * | 11/2000 | Pickett ........................ 370/466 |
| 6,763,233 | B2 | * | 7/2004 | Bharatia ...................... 455/433 |
| 6,801,540 | B1 | * | 10/2004 | Jeong ........................ 370/466 |
| 6,819,665 | B1 | * | 11/2004 | Pinard et al. ................. 370/352 |
| 6,829,243 | B1 | * | 12/2004 | Sundhar ...................... 370/401 |
| 2001/0015969 | A1 | | 8/2001 | Otsuka ........................ 370/352 |
| 2001/0015971 | A1 | | 8/2001 | Tanimura ..................... 370/352 |

FOREIGN PATENT DOCUMENTS

| | | |
|---|---|---|
| WO | WO 01/06740 | 1/2001 |

OTHER PUBLICATIONS

"*Combined Search and Examination Report under Section 17 & 18(3)*" dated on Mar. 11, 2003 issued by U.K. Patent Office.

Bur Goode, "*Voice Over Internet Protocol (VoIP)*," IEEE, vol. 90, No. 9, pp. 1495-1517, Sep. 2002.

Korean Patent Application No. 2001-63192 to Doo-Yong Yang et al., entitled *Internet Protocol Telephony Exchange System and Method Basic Call Processing Same*, filed in the Republic of Korea on Oct. 13, 2001.

\* cited by examiner

CALL PROCESSING MESSAGE CONVERTER AND MESSAGE CONVERTING METHOD IN INTERNET PROTOCOL TELEPHONY EXCHANGE SYSTEM

CLAIM OF PRIORITY

This application makes reference to, incorporates the same herein, and claims all benefits accruing under 35 U.S.C. §119 from an application for METHOD FOR CONVERTING CALL PROCESSING IN INTERNET PROTOCOL TELEPHONY EXCHANGE SYSTEM earlier filed in the Korean Industrial Property Office on 13 Oct. 2001 and there duly assigned Serial No. 2001-63241.

BACKGROUND OF THE INVENTION

1. Field of the Invention

The present invention relates generally to a call processing message converter and message converting method in Internet protocol (IP) telephony exchange system, which is configured in a is manner that it can control IP terminals like legacy terminals by transceiving user information with IP terminals.

2. Description of the Related Art

Recently, as the Internet is expanding rapidly to the vast majority of the world, and to meet the needs for a variety of different services, IP has been developed at a remarkable speed in terms of performances and services it provides to users. Not being satisfied here, users are continually asking for more diverse services. One of the examples is transmission of voice signals using IP network (or VoIP: Voice over Internet Protocol). Besides the data transmission of voice signals through such an IP network, other manifold services associated with the voice signal transmission, yet being a major part of the IP network, have been requested more and more.

As an attempt to meet the request, a technique for integrating generally used legacy telecommunication and VoIP is under development for interworking with a current communication network. For instance, integration of IP-based private automatic branch exchanges, i.e., IP-PBX (Internet Protocol PBX (private branch exchange)) and IP-Centrex, is the typical one. Therefore, to satisfy different needs of users, the terminals for use of an IP network should be able to have the same format and same performances with those used for PSTN (Public Switching Telephone Network).

A general IP-phone protocol currently being used right now is one of H.323 recommended by ITU-T (telecommunication standardization sector of the International Telecommunication Union), MGCP (Media Gateway Control Protocol) used between a media gateway and a media gateway controller for controlling the media gateway, or SIP (Session Initiation Protocol), a multimedia communication standard supporting integration of data, voice and image.

Normally, IP network and PSTN are separated from each other, and therefore, terminals that are accessible to each network have different protocols and different characteristics. More specifically, terminals that are connectable to PSTN are subscriber terminals including analog telephones, digital telephones or modems, while terminals that are connectable to trunk connection part include E1/T1 (E1 is a European subscriber line, a type of a dedicated circuit for transmitting data at a speed of 2.048 Mbps (megabits per second) in a manner of wide area digital transmitting technique; T1 being a digital transmission standard in for example North America that carries a digital signal level-1 (DS1)), PRI (primary rate interface), loop and No. 7 signaling and so forth. Further, terminals that are connectable to the IP network include H.323 terminals, MGCP terminals, SIP terminals and so on. To transmit/receive (transmit and receive) voices using an IP-terminal and IP network, the terminal should be connected to an IP-line through LAN (local area network) and gatekeeper.

In other words, to enable IP network subscribers and PSTN subscribers to communicate with each other by interworking of IP network and PSTN, any type of gateway is necessary, and to seize such a gateway, an independent system for seizing internetwork should be configured. This means that IP network and PSTN have their own mutually independent number systems and terminal management systems.

In case a general legacy terminal accommodated to PSTN calls another general legacy terminal, depending on the address of a called party's terminal (domestic, long-distance, overseas, wire/wireless), a pre-designated prefix is dialed to make the call. However, if the called party uses an IP terminal, it was essential to dial a prefix seizing a gateway that is connected to a corresponding exchange.

Similarly, uses having IP terminal connected over the Internet should dial a pre-designated prefix in conforming to the address of the other party (domestic or other areas). Further, if it is necessary to make a call to the PSTN, users must dial a prefix for seizing a gateway that is connected to an exchange system to control the other party's terminal.

However, according to the conventional technology described above, mutually independent systems are in charge of controlling calls between PSTN based terminals and IP network based terminals. Thus, to configure voice channels between IP terminals and legacy terminals, two separate systems are required. This means that a service should be carried out independently over the interwork of the two systems, and integrated function and terminal management system over internetwork is therefore impossible. Unfortunately, this made it very difficult to integrate IP terminals in areas using the existing PSTN or within a building. That is, implementation of an IP based internal private automatic branch exchange got very complicated since PBX cannot process calls from IP terminals like extension telephones, and as a result thereof, a number of services provided by PBX were not available.

SUMMARY OF THE INVENTION

It is, therefore, an object of the present invention to provide a call processing message converter and message converting method in Internet protocol telephony system for interconversion of protocol signals from an IP terminal and messages from an exchange, in order to provide call services based on one integrated system by offering the same telephone system and same maintenance system to IP terminals and legacy terminals.

Another object of the present invention is to provide a call processing message converter and message converting method for operating messages from an IP terminal as messages from a legacy terminal by converting H.323 relevant messages that are transmitted/received (transmitted or received or both transmitted and received) between an IP terminal and an IP driver (IP Driver: Gatekeeper) to a call processing message of PSTN.

To achieve the above and other objects, there is provided a call processing message converting method in an IP-PBX system, wherein the IP-PBX system includes a hub connected to an Internet protocol (IP), having a plurality of LAN communication ports; user information interface connected to the LAN communication port of the hub for generating user information and for outputting the generated user information or for converting received exchange user information to an identifiable state to users; at least one IP terminal for performing VoIP function in conforming to a pre-designated data communication protocol procedure; IP driver connected to the LAN communication port of the hub for controlling Internet protocol endpoints; and IP-PBX (Internet protocol—private automatic branch exchange), mounted with a database where telephone numbers of a legacy terminal and the plurality of IP terminals and corresponding terminal information, and an exchange interface and a gateway connected to the LAN communication port of the hub, respectively, for conducting call processing services corresponding to user information that is sent to the exchange interface and corresponding to call connection information that is generated from the legacy terminal, the method including the steps of: transporting an ARQ (Admission Request) request message to a call processing module in the IP-PBX in correspondence to an inputted ARQ message that includes port information transported from the originating IP terminal and digitized information corresponding to the other party's telephone number; transporting an ACF (Admission Confirm) message to the originating IP terminal in response to a seizing message corresponding to digit that is included in the ARQ request message from the call processing module; transporting a setup message that is transferred from the originating IP terminal to a terminating IP terminal, and simultaneously transporting a setup response message to the originating IP terminal; transporting an ACF message to the terminal IP terminal in response to the ARQ message that is transported from the originating IP terminal, transporting an alert message that is transported from the terminating IP terminal to the originating IP terminal, and transporting a system identification (ID) information to the call processing module; and forming an IP channel between the two IP terminals by transporting a connect message that is transported from the terminating IP terminal to the originating IP terminal and by transporting polarity to the call processing module.

According to the call processing converting method described above, H.323 related messages transported from an IP terminal are converted to PSTN exchange call processing messages before they are transported to the call processing module of the legacy terminal, so the call processing module can monitor operation state of IP terminals that form VoIP channels through IP network and IP driver. In this manner, the IP terminals are equivalently treated like PBX extension telephones. In short, since IP terminals can be regarded as the extension subscribers of a legacy terminal in PBX, more diverse exchange services e.g., ring group service, pilot number group service etc., are now available.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

A preferred embodiment of the present invention will be described herein below with reference to the accompanying drawings. In the following description, well-known functions or constructions are not described in detail since they would obscure the invention in unnecessary detail.

Figure 1:
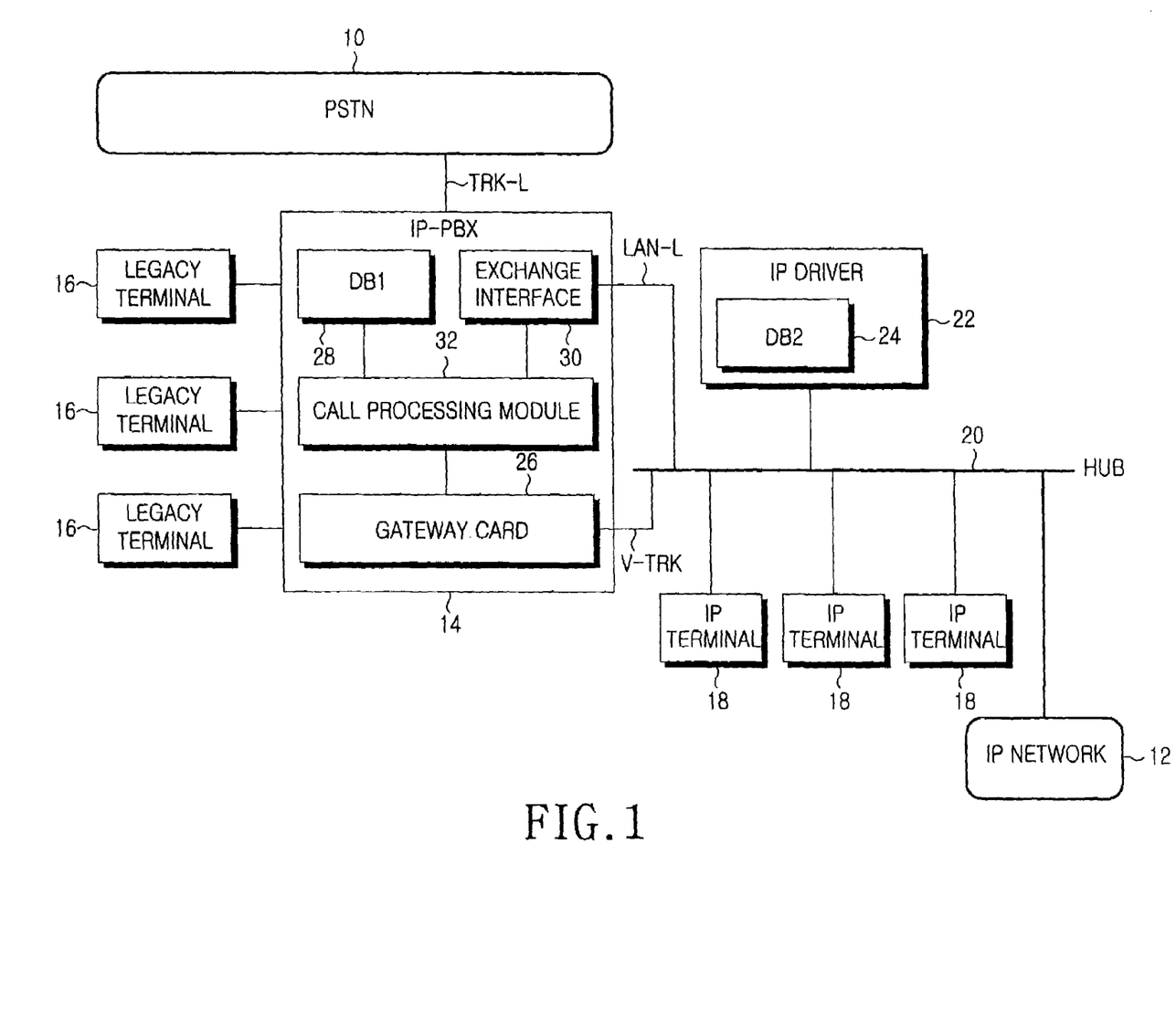
FIG. 1 is a block diagram of Internet protocol (IP) telephony system in accordance with a preferred embodiment of the present invention.

FIG. 1 is a block diagram of an Internet protocol (IP) telephony system embodying the principles of the present invention. As shown in the drawing, IP-PBX 14 for conducting channel switching of at least one legacy terminals 16 is connected to PSTN 10 through a central office card (or board circuit) (now shown). Although not fully explained in the present invention, the central office trunk card that interfaces E1/T1, PRI/BRI/No. 7 signaling is well known in this field. Further, channel connection by originating/terminating terminals, more specifically, at least one legacy terminals, such as, analog telephones or digital telephones, is conventional. Therefore, the embodiment of the present invention will relate to call connection services between legacy terminals and IP terminals, call connection services between IP terminals, and IP trunk from legacy terminals/IP terminals (VoIP connection through a gateway).

An IP-PBX system embodying the principles of the present invention largely includes IP-PBX 14 connected to PSTN 10 for carrying out general call processing services of legacy terminals 16; IP terminals 18 connected to the IP-PBX 14 and IP network 12, having a user interface that generates and displays every kind of tone in response to dialing tones, ring tones and ring back tones, or every kind of display information message input, and generates dial digit information; and IP driver (gate keeper) 22. Here, IP-PBX 14 includes a gateway card 26 for mutually connecting different kinds of telecommunication networks. Further, the IP-PBX 14, the gateway card 26 located at the inside thereof, the IP driver 22, and the plurality of IP terminals 18 are all connected to the IP network 12, and eventually to the LAN terminal port of hub 20 that performs switch connection of a number of LAN ports. Usually, any commercially used hub can be employed for the hub 20.

IP-PBX 14, besides providing a call processing service of general legacy terminals 16, is capable of processing calls from IP terminals 18 connected to the IP network 12 in the same light with calls from extension subscribers. The operation involved here is now explained as follows.

The IP-PBX 14 includes database (DB1) 28, in which subscriber information, such as, telephone numbers of IP terminals 18 that are connected to IP network 12 through hub 20 using telephone numbers of legacy terminals that are accommodated to the IP-PBX 14 and information on port numbers, or IP addresses, is stored; a gateway card 26 for forming a basic channel between the IP network 12 and PSTN; an exchange interface 30 for receiving information about a calling party that is transported from the plural IP terminals 18 connected through the hub 20, or for transporting terminating call information to the IP terminals; and a call processing module 32 for controlling call services between the legacy terminals 16 and the IP terminals 18. Exchange interface 30 and gateway card 26 include LAN for making LAN communication through the hub 20.

IP terminals 18 include a user interface which generates user information like hook state information including ID code, digit, and every kind of tone message, and transmits/receives the generated user information; and a communication module connected to the IP network for conducting VoIP function in accordance with H.323/MGCP/SIP protocol procedure. Here, the user interface mainly generates different kinds of tones in response to a message or command provided from IP-PBX 14, or operates a displayer, or generates every kind of digit tone corresponding to pre-designated telephone numbers onto IP terminals, port numbers, IP addresses, and key buttons the users selected. The user information is then interfaced with IP-PBX 14 through LAN.

Later, IP terminals 18 provide ID cord obtained from IP-PBX 14, such as, user information like telephone numbers and port numbers, to exchange interface 30 inside of IP-PBX 14 through LAN. Usually, user information data that is transmitted/received directly with IP-PBX 14 through the exchange interface 30 includes ID code, dial on/off messages, digit information and other information for controlling terminals.

IP driver (gate keeper) 22, connected to the IP-PBX 14, and to the IP terminals 18 through hub 20, controls IP endpoints in response to IP terminal connection information based on the H.323/MGCP/SIP protocol procedure, and in response to call processing information. Here, the IP endpoints are where the IP terminals are located. The IP driver (gate keeper) 22 also includes a database (DB2) 24.

Thusly constructed IP-PBX system of the present invention makes things like addition/change/deletion of subscriber information much easier by offering telephone numbers given to legacy terminals 16, and every subscriber information to each of the plural IP terminals 18 connected to IP network 12 through hub 20. For example, using a maintenance terminal (not shown), information like telephone numbers, port numbers, and IP addresses corresponding to each IP terminal 18, is loaded upon database 28. The maintenance involved here is done as usual. Shortly speaking, the present invention having the configuration shown in FIG. 1 makes it possible to maintain information in a single integrated system, and this is quite different from the conventional system in which two independent systems were required for the same. In other words, whether it is of an IP terminal or legacy terminal, the call is processed is equally in one system.

More details on call processing between an IP terminal and another IP terminal, call processing operation between IP terminals and legacy terminals, and call processing operation from a legacy terminal or an IP terminal to IP network 10 in the IP-PBX system having certain features of the configuration shown in FIG. 1 are disclosed in the Korean Patent Application No. 2001-63192, applied on Oct. 13, 2001 by Doo-Yong Yang et al., under the title "Internet Protocol Telephony Exchange System and Method Basic Call Processing Same". Therefore, the present invention only discloses the technology involved in transportation of H.323/MGCP/SIP relevant messages, which are generated from IP terminals and are converted to the ones recognizable (or readable) by a PSTN exchange, to an originating call processing unit CLG and a terminating call processing unit CLD at the inside of the call processing module 32. Therefore, technologies involved in different operations are found in the Korean Patent Application No. 2001-63192.

Figure 2:
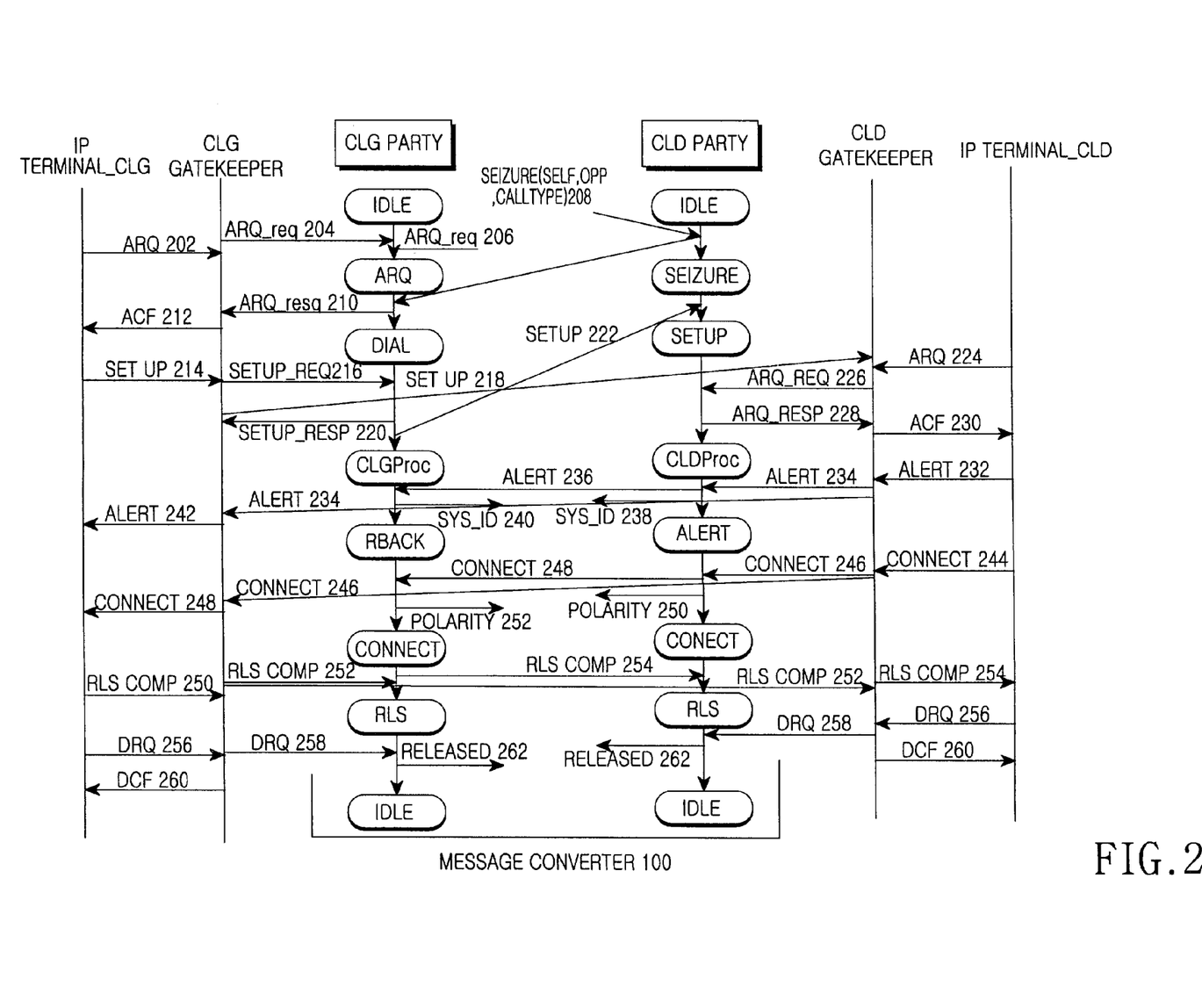
FIG. 2 is a flow chart illustrating call processing message converting control in accordance with the preferred embodiment of the present invention.

FIG. 2 is a flow chart illustrating call processing message converting control in accordance with the preferred embodiment of the present invention. In the drawing, IPterminal_CLG and Ipterminal_CLD indicate an originating IP terminal and a terminating IP terminal, respectively. In addition, CLG_GateKeeper and CLD_GateKeeper indicate the sequence of a hardware card of IP driver 22. Message converter 100 is indicated by CLG party and CLD party, IP call processing units of IP driver 22.

Thusly constructed message converter 100 of FIG. 2 converts H.323/MGCP/SIP relevant messages transmitted/received from IP terminals to a format that is recognizable by the call processing module 32 in the IP-PBX 14, and transmits/receives the converted messages with the call processing module 32 through the exchange interface 30. Specifically speaking, the H.323/MGCP/SIP relevant messages transported from the IP-PBX 14 are converted to exchange messages and are sent to the call processing module 32, and the exchange messages transported from the IP-PBX 14 are converted to H.323 messages and are sent to IP driver and IP terminal. In this manner, the call processing module 32, whose database stores IP terminals' telephone numbers and port numbers, can manage the IP terminals like legacy terminals.

Before getting into further details on the call processing message converting operation in the IP-PBX system embodying the principles of the present invention, it should be noted that no explanation would be provided regarding call processing between legacy terminals accommodated to IP-PBX 14 because it works in the same way as the typical exchange system. Accordingly, the present invention will be focused mainly on how to convert H.323 relevant messages generated from IP terminals.

If a user using one of the IP terminals 18 depicted in FIG. 1 inputs digits by doing hook-off in order to call a neighboring IP terminal, the originating IP terminal transports user information including ID and the inputted digit information to call processing module 32 through exchange interface 30. Here, user information usually includes telephone number given to the IP terminal, port number of IP-PBX 14, state message indicating hook off/on, and a plurality of control messages for operating bells or every kind of displayer of the IP terminal in IP-PBX. Moreover, among other user information, especially the port number of the system or telephone number can be stored by downloading when the system is initialized.

Referring to FIG. 2, the originating IP terminal transports ARQ (Admission Request) messages to IP driver (Gatekeeper) 22 (S202). At this time, the information loaded upon the ARQ messages includes port number and digit information (the other party's telephone number) provided by a user as the user selects a key button located on the IP terminal.

Upon receiving the ARQ message from the originating IP terminal, IP driver 22 transports ARQ request message (ARQ req) to CLG of the originating call processing unit (S204). Then, the CLG of the originating call processing unit transports the received ARQ request message to the call processing module 32 through the exchange interface 30 inside of IP-PBX 14. The originating call processing unit of the call processing module 32 inside of IP-PBX 14 analyzes the ARQ request message and performs Hof process of a corresponding IP terminal, and simultaneously, it processes digits included in the ARQ request message (AR1_req) and finally sends a seizure message to the terminating call processing unit.

The terminating call processing unit inside of IP-PBX 14 seizes the terminating call in response to the seizure message, and transports a seizure complete message [Seizure (self_opp, calltype)] to the terminating call processing unit CLD inside of IP driver 22 (S208). Using H.323 message converting described above, IP-PBX 14 can find out which terminal among the plurality of IP terminals originated the call, and which terminal terminated the call. Following the step 208, the terminating call processing unit inside of IP-PBX 14 transports a ring-on message to the terminating IP terminal through exchange interface 30. The terminating IP terminal that receives the ring-on message then operates a ringer inside and notifies it duly received the message.

On the other hand, the terminating call processing unit CLD inside of IP driver 22, having received the seizure complete message [Seizure (self_opp, calltype)] from IP-PBX 14, transports the message to the originating call processing unit CLG, and enters the seizure state. After receiving the seizure complete message [Seizure (self_opp, calltype)], the originating call processing unit CLG converts the message received to H.323 message, and responds to this reception through hardware of IP driver 22. Then, the originating call processing unit CLG transports an ACF (Admission Confirm) message to the originating IP terminal, and enters the dial mode (S210 through 214).

After the originating IP terminal sends a setup message to the calling party (S214), the calling party of the IP driver 22 transports the setup request message (set-req) to the originating call processing unit CLG inside of the IP driver 22 (S216). Later, the calling party of the IP driver 22 transports the setup message received to the terminating party of the IP driver 22 (S218). At this time, the originating call processing unit CLG inside of the IP driver 22 transports a setup response message (set_rep) in response to the setup request message (set_req) received to the calling party of the IP driver 22 (S220), and enters the calling operation mode.

In the meantime, the terminating IP terminal does hook-off in response to the ring-on message from the aforementioned IP-PBX 14, and the IP terminal transports the ring-on message to the terminating party inside of the IP driver 22 (S224). The terminating party inside of the IP driver 22 transports an ARQ request message (ARQ_req) to the terminating call processing unit CLD of the IP driver 22 in the setup mode (S226).

The terminating call processing unit CLD transports an ARQ response message (ARQ_resp) to a terminating unit inside of the IP driver 22, and enters call in operation (S228), and the terminating unit inside of the IP driver 22 transports an ACF message to the terminating IP terminal. In this way, the call processing module 32 inside of IP-PBX 14 can monitor H.323 relevant messages of IP terminals, and manages IP terminals like extension subscribers.

ITU-T Q.931 relevant messages are processed in a similar way, and its channel is designated, maintained and released accordingly. That is, when an alert message is transported from a terminating IP terminal (S232), the alert message is transferred to a terminating party of IP driver 22, to terminating call processing unit LCD and to an originating call processing unit CLG of IP driver 22, and to an originating IP terminal (S234, S236, and S242). Upon receiving the alert message, the terminating call processing unit LCD of the IP driver 22, and the originating call processing unit CLG transport a system ID (SYS_ID) to the terminating call processing unit and the originating call processing unit inside of the call processing module 32 of IP-PBX 14.

Following the above step, a connect message is transported from the terminating IP terminal (S244), and the connect message is forwarded to the terminating party of IP driver 22, to the terminating call processing unit LCD of IP driver 22, to the originating call processing unit CLG, and to the originating IP terminal (S246, S248, and S250), and the originating IP terminal and the terminating IP terminal enter the calling mode. After receiving the connect message, the terminating call processor unit LCD and the originating call processing unit CLG of IP driver 22 transport a polarity message to the terminating call processing unit and the originating call processing unit inside of the call processing module 21 of IP-PBX 14 (S250 and S252).

When the originating IP terminal is hooked off, and a release complete message (RLS Comp) is generated therefrom (S250), the message is sent to the calling party of IP driver 22, to the originating call processing unit CLG of IP driver 22, to the terminating call processing unit CLD, and to the terminating IP terminal (S254 and S256).

Meanwhile, the originating call processing unit CLG of IP driver 22 and the terminating call processor unit CLD are transferred to the release mode. When the call release complete message is generated or when a DRQ (disengage request) message is generated from the originating and the terminating IP terminals upon receiving the call release complete message, this information is inputted into each call processing unit, CLG and CLD, respectively (S258). At this time, the calling party and the terminating party of IP driver 22 transport the DCF message to its own IP terminal (S260) to release the call connection, and the originating call processing unit CLG and the terminating call processing unit CLD inside of IP driver 22, respectively, transports the connect release complete message (released), or hook-on message, to the call processing unit inside of IP-PBX 14 (S262).

In conclusion, the present invention can provide a variety of additional services that are usually provided by a general private automatic branch exchange by converting messages like ARQ/Setup to exchange messages, (it used to be done at a gatekeeper) and by having the gatekeeper interwork with IP-PBX, one of extension private automatic branch exchanges, and as a result thereof, a limitation was set on a corresponding call and more messages could be processed.

Although the conventional PBX using a central office for a gateway could not provide many extension functions of the PBX, the message converter embodying the principles of the present invention, it being able to handle/manage IP terminals equally to the existing extension, implements a number of functions of the PBX that an IP terminal connected to the existing IP network could not provide.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A call processing message converting method in an Internet Protocol-private automatic branch exchange (IP-PBX) system including: a hub connected to an Internet Protocol network; at least one Internet Protocol terminal, connected to a local area network communication port of a hub, to perform a voice over Internet Protocol function conforming to a data communication Protocol procedure; the Internet Protocol driver, connected to the local area network communication port of the hub, to control Internet Protocol endpoints; and an Internet Protocol-private automatic branch exchange, connected to the local area network communication port of the hub, to conduct call processing services, the method comprising:

receiving an Admission Request (ARQ) message including its own port information and another party's telephone number from an originating Internet Protocol terminal;

sending an ARQ request message to the IP-PBX, the ARQ request message converted to a format recognized by the Internet Protocol-private automatic branch exchange;

receiving a seizing message corresponding to the ARQ request message from the Internet Protocol-private automatic branch exchange, and sending an admission confirm message to the originating Internet Protocol terminal in response to the seizing message;

sending a setup message from the originating Internet Protocol terminal to a terminating Internet Protocol terminal, and simultaneously sending a setup response message to the originating Internet Protocol terminal;

sending the admission confirm message to the terminal Internet Protocol terminal in response to the admission request message from the originating Internet Protocol terminal, sending an alert message from the terminating Internet Protocol terminal to the originating Internet Protocol terminal, and sending a system identification information to the Internet Protocol-private automatic branch exchange; and forming an Internet Protocol channel between the originating and terminating Internet Protocol terminals by sending a connect message from the terminating Internet Protocol terminal to the originating Internet Protocol terminal and by sending polarity to the Internet Protocol-private automatic branch exchange.

2. The method as claimed in claim 1, further comprising:
sending a channel recovery complete message of a corresponding Internet Protocol terminal to the Internet Protocol-private automatic branch exchange in response to the recovery complete message and a connect release confirm message from the Internet Protocol terminal.

3. A call processing message converter in an Internet Protocol-private automatic branch exchange system, the call processing message converter comprising:
a hub connected to an Internet Protocol network;
at least one Internet Protocol terminal, connected to a local area network communication port of a hub, to perform a voice over Internet Protocol function;
an Internet Protocol driver, connected to the local area network communication port of the hub, to control Internet Protocol endpoints; and
an Internet Protocol-private automatic branch exchange, connected to a PSTN network, legacy terminal and the hub, to process a call requested by the legacy terminal and the Internet Protocol driver;
wherein the Internet Protocol driver converts an Admission Request (ARQ) message from an originating Internet Protocol terminal into an ARQ request message recognizable by the Internet Protocol-private automatic branch exchange, sends the ARQ request message to the Internet Protocol-private automatic branch exchange, and sends a termination seizure message from the Internet Protocol-private automatic branch exchange and user control information of a terminating Internet Protocol terminal to the terminating terminal; and
wherein the Internet Protocol driver sends a polarity message to the Internet Protocol-private automatic branch exchange in response to a connect message from the terminating Internet Protocol terminal.

4. The call processing message converter according to claim 3, wherein the Internet Protocol driver sends a channel recovery complete message to the Internet Protocol-private automatic branch exchange in response to a connect release request message from either the originating Internet Protocol terminal or the terminating Internet Protocol terminal.

5. A call processing message converter in an Internet Protocol-private automatic branch exchange system, the call processing message converter comprising:
a hub connected to an Internet Protocol network;
at least one Internet Protocol terminal, connected to a local area network communication port of a hub, to perform a voice over Internet Protocol function;
an Internet Protocol driver, connected to the local area network communication port of the hub, to control Internet Protocol endpoints; and
an Internet Protocol-private automatic branch exchange, connected to a PSTN network, legacy terminal and the hub, to process a call requested by the legacy terminal and the Internet Protocol driver;
wherein the Internet Protocol driver converts an Admission Request (ARQ) message from an originating Internet Protocol terminal into an ARQ request message recognizable by the Internet Protocol-private automatic branch exchange, sends the ARQ request message to the Internet Protocol-private automatic branch exchange, and sends a termination seizure message from the Internet Protocol-private automatic branch exchange and user control information of a terminating Internet Protocol terminal to the terminating terminal;
wherein the Internet Protocol driver sends a system identification to an Internet Protocol-private automatic branch exchange in response to an alert message from the terminating Internet Protocol terminal; and
wherein the Internet Protocol driver sends a polarity message to the Internet Protocol-private automatic branch exchange in response to a connect message from the terminating Internet Protocol terminal.

6. A call processing message converter in an Internet Protocol-private automatic branch exchange system, the call processing message converter comprising:
a hub connected to an Internet Protocol network;
at least one Internet Protocol terminal, connected to a local area network communication port of a hub, to perform a voice over Internet Protocol function;
an Internet Protocol driver, connected to the local area network communication port of the hub, to control Internet Protocol endpoints; and
an Internet Protocol-private automatic branch exchange, connected to a PSTN network, legacy terminal and the hub, to process a call requested by the legacy terminal and the Internet Protocol driver;
wherein the Internet Protocol driver converts an Admission Request (ARQ) message from an originating Internet Protocol terminal into an ARQ request message recognizable by the Internet Protocol-private automatic branch exchange, sends the ARQ request message to the Internet Protocol-private automatic branch exchange, and sends a termination seizure message from the Internet Protocol-private automatic branch exchange and user control information of a terminating Internet Protocol terminal to the terminating terminal;
wherein the Internet Protocol driver sends a system identification to an Internet Protocol-private automatic branch exchange in response to an alert message from the terminating Internet Protocol terminal; and
wherein the Internet Protocol driver sends a channel recovery complete message to the Internet Protocol-private automatic branch exchange in response to a connect release request message from either the originating Internet Protocol terminal or the terminating Internet Protocol terminal.

7. A call processing message converter in an Internet Protocol-private automatic branch exchange system, the call processing message converter comprising:
a hub connected to an Internet Protocol network;
at least one Internet Protocol terminal, connected to a local area network communication port of a hub, to perform a voice over Internet Protocol function;
an Internet Protocol driver, connected to the local area network communication port of the hub, to control Internet Protocol endpoints; and an Internet Protocol-private automatic branch exchange, connected to a PSTN network, legacy terminal and the hub, to process a call requested by the legacy terminal and the Internet Protocol driver;

wherein the Internet Protocol driver converts an Admission Request (ARQ) message from an originating Internet Protocol terminal into an ARQ request message recognizable by the Internet Protocol-private automatic branch exchange, sends the ARQ request message to the Internet Protocol-private automatic branch exchange, and sends a termination seizure message from the Internet Protocol-private automatic branch exchange and user control information of a terminating Internet Protocol terminal to the terminating terminal;

wherein the Internet Protocol driver sends a system identification to an Internet Protocol-private automatic branch exchange in response to an alert message from the terminating Internet Protocol terminal; and wherein the Internet Protocol driver sends a channel recovery complete message to the Internet Protocol-private automatic branch exchange in response to a connect release request message from either the originating Internet Protocol terminal or the terminating Internet Protocol terminal.

8. A call processing message converter in an Internet Protocol-private automatic branch exchange system, the call processing message converter comprising:

a hub connected to an Internet Protocol network;

at least one Internet Protocol terminal, connected to a local area network communication port of a hub, to perform a voice over Internet Protocol function;

an Internet Protocol driver, connected to the local area network communication port of the hub, to control Internet Protocol endpoints; and an Internet Protocol-private automatic branch exchange, connected to a PSTN network, legacy terminal and the hub, to process a call requested by the legacy terminal and the Internet Protocol driver;

wherein the Internet Protocol driver converts an Admission Request (ARQ) message from an originating Internet Protocol terminal into an ARQ request message recognizable by the Internet Protocol-private automatic branch exchange, sends the ARQ request message to the Internet Protocol-private automatic branch exchange, and sends a termination seizure message from the Internet Protocol-private automatic branch exchange and user control information of a terminating Internet Protocol terminal to the terminating terminal; and wherein the Internet Protocol driver sends a channel recovery complete message to the Internet Protocol-private automatic branch exchange in response to a connect release request message from either the originating Internet Protocol terminal or the terminating Internet Protocol terminal.

9. A call processing message converting method in an Internet Protocol-private automatic branch exchange system, the method comprising:

receiving an Admission Request (ARQ) message including its own port information and another user's telephone number from an originating Internet Protocol terminal;

sending the ARQ request message to the Internet Protocol-private automatic branch exchange, the ARQ request message converted to a format recognized by the Internet Protocol-private automatic branch exchange;

sending an admission confirm message to the originating Internet Protocol terminal in response to a seizing message corresponding to the ARQ request message from the Internet Protocol-private automatic branch exchange;

sending a setup message from the originating Internet Protocol terminal to the terminating Internet Protocol terminal, and simultaneously sending a setup response message to the originating Internet Protocol terminal;

sending an admission confirm message to the terminating Internet Protocol terminal in response to the ARQ message from the originating Internet Protocol terminal, sending an alert message from the terminating Internet Protocol terminal to the originating Internet Protocol terminal, and sending a system identification information to the Internet Protocol-private automatic branch exchange; and forming an Internet Protocol channel between the originating and terminating Internet Protocol terminals by sending a connect message from the terminating Internet Protocol terminal to the originating Internet Protocol terminal and by sending polarity to the Internet Protocol-private automatic branch exchange.

10. The method as claimed in claim 9, further comprising sending a channel recovery complete message of a corresponding Internet Protocol terminal to the Internet Protocol-private automatic branch exchange in response to a recovery complete message and a connect release confirm message from the Internet Protocol terminal.

11. A call processing message converting apparatus in an Internet Protocol-private automatic branch exchange system, the apparatus comprising:

a first unit connected to an Internet Protocol network, including a plurality of local area network communication ports;

a user information interface connected to the local area network communication port of the first unit to generate user information and to transmit the generated user information or to convert received user information to an identifiable state to users;

at least one Internet Protocol terminal to perform a voice over Internet Protocol function; and an Internet Protocol driver, connected to the local area network communication port of the first unit, to control Internet Protocol endpoints, to convert an Admission Request (ARQ) message from the originating Internet Protocol terminal to an ARQ request message formed format recognized by the Internet Protocol-private automatic branch exchange, to transmit the converted message to the Internet Protocol-private automatic branch exchange, and to send a termination seizure message from the Internet Protocol-private automatic branch exchange and user control information of the terminating Internet Protocol terminal to the terminating terminal;

wherein the Internet Protocol-private automatic branch exchange is connected to a PSTN network, a legacy terminal and the first unit to conduct call processing from the legacy terminal and the Internet Protocol driver;

wherein the Internet Protocol driver sends a system identification to the Internet Protocol-private automatic branch exchange in response to an alert message from the terminating Internet Protocol terminal; and wherein the Internet Protocol driver sends a polarity message to the Internet Protocol-private automatic branch exchange in response to a connect message from the terminating Internet Protocol terminal.

12. The apparatus of claim 11, wherein the Internet Protocol driver sends a channel recovery complete message to the Internet Protocol-private automatic branch exchange in response to a connect release request message from either the originating Internet Protocol terminal or the terminating Internet Protocol terminal.

13. A call processing message converting apparatus in an Internet Protocol-private automatic branch exchange system, the apparatus comprising:

a first unit connected to an Internet Protocol network, including a plurality of local area network communication ports;

a user information interface connected to the local area network communication port of the first unit to generate user information and to transmit the generated user information or to convert received user information to an identifiable state to users;

at least one Internet Protocol terminal to perform a voice over Internet Protocol function; and an Internet Protocol driver, connected to the local area network communication port of the first unit, to control Internet Protocol endpoints, to convert an Admission Request (ARQ) message from the originating Internet Protocol terminal to an ARQ request message formed format recognized by the Internet Protocol-private automatic branch exchange, to transmit the converted message to the Internet Protocol-private automatic branch exchange, and to send a termination seizure message from the Internet Protocol-private automatic branch exchange and user control information of the terminating Internet Protocol terminal to the terminating terminal;

wherein the Internet Protocol-private automatic branch exchange is connected to a PSTN network, a legacy terminal and the first unit to conduct call processing from the legacy terminal and the internet Protocol driver; and wherein the Internet Protocol driver sends a polarity message to the Internet Protocol-private automatic branch exchange in response to a connect message from the terminating Internet Protocol terminal.

* * * * *